(12) United States Patent
Daigger

(10) Patent No.: US 7,927,493 B2
(45) Date of Patent: Apr. 19, 2011

(54) LOW PHOSPHORUS WATER TREATMENT METHODS

(75) Inventor: Glen T. Daigger, Parker, CO (US)

(73) Assignee: CH2M Hill, Inc., Englewood, CO (US)

( * ) Notice: Subject to any disclaimer, the term of this patent is extended or adjusted under 35 U.S.C. 154(b) by 444 days.

(21) Appl. No.: 12/119,175

(22) Filed: May 12, 2008

(65) Prior Publication Data

US 2008/0302723 A1 Dec. 11, 2008

Related U.S. Application Data

(60) Provisional application No. 60/917,478, filed on May 11, 2007.

(51) Int. Cl.
*C02F 3/00* (2006.01)

(52) U.S. Cl. .............. 210/631; 210/723; 210/198.1; 210/207; 210/209; 210/906

(58) Field of Classification Search ............. 210/631, 210/723, 198.1, 207, 209, 906
See application file for complete search history.

(56) References Cited

U.S. PATENT DOCUMENTS

| | | | |
|---|---|---|---|
| 3,763,038 A | 10/1973 | Misaka et al. | |
| 3,764,524 A | 10/1973 | Stankewich, Jr. | |
| 3,994,802 A | 11/1976 | Casey et al. | |
| 4,008,161 A | 2/1977 | Wong et al. | |
| 4,021,347 A | 5/1977 | Teller et al. | |
| 4,029,575 A | 6/1977 | Bykowski et al. | |
| 4,042,493 A | 8/1977 | Matsch et al. | |
| 4,081,365 A | 3/1978 | White et al. | |
| 4,160,724 A | 7/1979 | Laughton | |
| 4,167,479 A | 9/1979 | Besik | |
| 4,183,809 A | 1/1980 | Klapwijk et al. | |
| 4,207,397 A | 6/1980 | Davis et al. | |
| 4,209,396 A | 6/1980 | White et al. | |
| 4,237,002 A | 12/1980 | Strudgeon et al. | |
| 4,416,779 A | 11/1983 | Ripl et al. | |
| 4,566,986 A | 1/1986 | Waldmann | |
| RE32,429 E | 6/1987 | Spector | |

(Continued)

FOREIGN PATENT DOCUMENTS

CA 2314383 1/2002

(Continued)

OTHER PUBLICATIONS

Crawford et al., "Membrane Bioreactors—A Designer's Perspective," Proceedings of the 29$^{th}$ WEAO Conference and Technical Symposium, Hamilton, Ontario, 2000.

(Continued)

*Primary Examiner* — Chester T Barry
(74) *Attorney, Agent, or Firm* — Dorsey & Whitney LLP

(57) ABSTRACT

A water or wastewater treatment system to reduce phosphorus or other pollutant concentrations in water or wastewater may include an optional primary treatment stage in fluid communication with a biological secondary treatment stage. The secondary treatment stage may, in turn, be fluidly connected with a tertiary treatment stage, which may include a chemical treatment portion for reducing phosphorus or other pollutants to desired levels. The precipitated phosphorus and other solids or sludge produced from the chemical treatment portion may be recycled upstream for reuse in the primary, secondary, and/or tertiary treatment stages. Such recycle may reduce the amount of added chemicals required in the tertiary treatment stage to phosphorus or other pollutants to desired amounts.

18 Claims, 4 Drawing Sheets

U.S. PATENT DOCUMENTS

| | | | |
|---|---|---|---|
| 4,721,569 A | | 1/1988 | Northrop |
| 4,724,085 A | | 2/1988 | Pohoreski |
| 4,780,208 A | * | 10/1988 | Bohnke et al. ............. 210/605 |
| 4,867,883 A | | 9/1989 | Daigger et al. |
| 4,999,111 A | | 3/1991 | Williamson |
| 5,022,993 A | | 6/1991 | Williamson |
| 5,043,072 A | | 8/1991 | Hitotsuyanagi et al. |
| 5,098,567 A | | 3/1992 | Nishiguchi |
| 5,128,040 A | | 7/1992 | Molof et al. |
| 5,160,043 A | | 11/1992 | Kos |
| 5,182,021 A | | 1/1993 | Spector |
| 5,354,471 A | | 10/1994 | Timpany et al. |
| 5,364,534 A | | 11/1994 | Anselme et al. |
| 5,380,438 A | | 1/1995 | Nungesser |
| 5,472,472 A | | 12/1995 | Northrop |
| 5,480,548 A | | 1/1996 | Daigger et al. |
| 5,514,278 A | | 5/1996 | Khudenko |
| 5,593,592 A | | 1/1997 | Kagawa et al. |
| 5,601,719 A | | 2/1997 | Hawkins et al. |
| 5,603,833 A | | 2/1997 | Miller |
| 5,643,453 A | | 7/1997 | Pannier et al. |
| 5,651,891 A | | 7/1997 | Molof et al. |
| 5,733,456 A | | 3/1998 | Okey et al. |
| 5,759,401 A | | 6/1998 | Boussely et al. |
| 5,853,588 A | | 12/1998 | Molof et al. |
| 5,853,589 A | | 12/1998 | Desjardins et al. |
| 5,855,793 A | | 1/1999 | Ikeda et al. |
| 5,890,454 A | | 4/1999 | Moore, Jr. |
| 6,027,649 A | | 2/2000 | Benedek et al. |
| 6,077,430 A | | 6/2000 | Chudoba et al. |
| 6,113,788 A | | 9/2000 | Molof et al. |
| 6,174,442 B1 | | 1/2001 | Geisser et al. |
| 6,217,768 B1 | | 4/2001 | Hansen et al. |
| 6,312,599 B1 | | 11/2001 | Reid |
| 6,322,701 B1 | | 11/2001 | Delighiannis |
| 6,338,799 B1 | | 1/2002 | Fukushima et al. |
| 6,406,628 B1 | | 6/2002 | Chang et al. |
| 6,406,629 B1 | | 6/2002 | Husain et al. |
| 6,447,687 B1 | | 9/2002 | Winn et al. |
| 6,485,645 B1 | | 11/2002 | Husain et al. |
| 6,517,723 B1 | | 2/2003 | Daigger et al. |
| 6,572,771 B2 | | 6/2003 | Yamasaki et al. |
| 6,706,185 B2 | | 3/2004 | Goel et al. |
| 6,733,662 B2 | | 5/2004 | Pollock |
| 6,808,629 B2 | | 10/2004 | Wouters-Wasiak et al. |
| 6,863,818 B2 | | 3/2005 | Daigger et al. |
| 6,893,567 B1 | | 5/2005 | Vanotti et al. |
| 6,946,073 B2 | | 9/2005 | Daigger et al. |

FOREIGN PATENT DOCUMENTS

| | | |
|---|---|---|
| JP | 60-38095 | 2/1985 |
| JP | 4-215892 | 8/1992 |
| JP | 11-262795 | 9/1999 |

OTHER PUBLICATIONS

Kayser et al., "Operational Results of the Wolfsburg Wastewater Treatment Plant," Wat. Sci. Tech., vol. 25, No. 4-5, pp. 203-209, (1992).

Lebeau et al., "Application of Immersed Membrane Microfiltration for NOM Removal," Paper presented at AWWA Annual Conference & Exhibition, Dallas, Texas, Jun. 21-25, 1998.

\* cited by examiner

LOW PHOSPHORUS WATER TREATMENT METHODS

CROSS-REFERENCE TO RELATED APPLICATIONS

This application claims under 35 U.S.C. §119(e) the benefit of U.S. provisional patent application No. 60/917,478, filed on May 11, 2007, and entitled "Low Phosphorous Water Treatment Methods and Systems", which is hereby incorporated by reference herein in its entirety.

FIELD OF INVENTION

The present invention generally relates to water treatment, and more specifically to removing phosphorus, nitrogen, heavy metals and other pollutants from water and wastewater.

INCORPORATION BY REFERENCE

U.S. Pat. No. 6,946,073, entitled "Method For Treating Wastewater In A Membrane Bioreactor To Produce A Low Phosphorus Effluent" and issued to Daigger et al. on Sep. 20, 2005, is hereby incorporated by reference herein in its entirety.

BACKGROUND

Reducing total phosphorus levels in wastewater to phosphorus concentration levels of about 0.5 mg/L or less when using a biological secondary treatment stage often requires use of a tertiary treatment stage after the biological treatment stage. Such tertiary stages may use a chemical treatment system to remove the phosphorus from the biologically treated water. The chemical treatment system may include adding metal salts, such as aluminum and iron salts, to precipitate or otherwise insolubilize the phosphorus, and then separating the precipitated and other insolubilizied phosphorus from the chemically treated water or wastewater. Although such chemical treatment systems can reduce the total phosphorus concentrations to levels of 0.5 mg/L or less, the operating and other costs for these systems, including the cost of the chemical, space for storing the chemical, the disposal costs for the solids formed by the chemical treatment and so on, are often high, making these chemical treatment systems relatively expensive to operate. Similar issues for attaining very low phosphorus levels in other types of water may arise when using a biological treatment as part of the water treatment process.

Accordingly, improved water and wastewater treatment systems are needed in the art.

SUMMARY OF THE INVENTION

One embodiment of the present invention may take the form of a method for treating wastewater. The method may include biologically treating a wastewater including a pollutant with a pollutant concentration to produce a biologically treated wastewater and a first sludge, separating at least a portion of the biologically treated wastewater from the first sludge, chemically treating the at least a portion of the separated biologically treated wastewater using at least a metal salt to reduce the pollutant concentration and to produce a second sludge comprising at least a portion of the metal salt, and contacting the at least a portion of the separated biologically treated wastewater with at least a portion of the second sludge at least prior to or during the chemical treatment.

Another embodiment of the present invention may take the form of a method for treating wastewater. The method may include biologically treating a wastewater including a pollutant with a pollutant concentration to produce a biologically treated wastewater and a first sludge, separating at least a portion of the biologically treated wastewater from the first sludge, chemically treating the at least a portion of the separated biologically treated wastewater using at least a metal salt to reduce the pollutant concentration and to produce a second sludge comprising at least a portion of the metal salt, and contacting the wastewater with at least a portion of the second sludge at least prior to or during the biological treatment.

Yet another embodiment may take the form of a system for treating wastewater including a wastewater supply, a biological treatment system, and a chemical treatment system. The biological treatment system may be downstream of the wastewater supply and in fluid communication with the wastewater supply. The chemical treatment system may be downstream of the biological treatment system and in fluid communication with the biological treatment system. The chemical treatment system may include a sludge outlet operatively associated with the biological treatment system.

Still yet another embodiment may take the form of a method for treating water. The method may include biologically treating a water including a pollutant with a pollutant concentration to produce a biologically treated water, chemically treating at least a portion of the biologically treated water using a treatment chemical to reduce the pollutant concentration and to produce a sludge comprising at least a portion of the treatment chemical, and contacting the at least a portion of the biologically treated water with at least a portion of the sludge at least prior to or during the chemical treatment. In some embodiments, the water may include wastewater.

A further embodiment may take the form of a method for treating water. The method may include biologically treating a water including a pollutant with a pollutant concentration to produce a biologically treated water, chemically treating at least a portion of the biologically treated water using at least a treatment chemical to reduce the pollutant concentration and to produce a sludge comprising at least a portion of the treatment chemical; and contacting the water with at least a portion of the sludge at least prior to or during the biological treatment.

Still yet a further embodiment may take the form of a system for treating water or wastewater. The system may include a biological treatment system and a chemical treatment system. The chemical treatment system may be downstream of the biological treatment system and in fluid communication with the biological treatment system. The chemical treatment system may include a sludge outlet operatively associated with the biological treatment system.

DETAILED DESCRIPTION

Described herein are various embodiments of wastewater or water treatment systems for reducing phosphorus or other pollutant concentrations in wastewater or water, respectively. The wastewater systems may take the form of an optional primary treatment stage in fluid communication with a secondary treatment stage. The secondary treatment stage may, in turn, be fluidly connected with a tertiary treatment stage, which may include a chemical treatment portion for removing a desired amount of phosphorus or other pollutants from the wastewater. The precipitated phosphorus and other solids or sludge produced from the chemical treatment portion may be recycled upstream for reuse in the primary, secondary, and/or tertiary treatment stages. Such recycling may reduce the amount of added chemicals required in the tertiary treatment stage to reduce phosphorus or other pollutant concentrations to desired levels.

The water systems may take the form of an initial treatment stage in fluid communication with a biological treatment stage. The biological treatment stage may, in turn, be fluidly connected with a tertiary treatment stage, which may include a chemical treatment portion for removing a desired amount of phosphorus or other pollutants from the water. Like the wastewater systems, the precipitated phosphorus and other solids or sludge produced from the chemical treatment portion may be recycled upstream for reuse in the initial, biological, and/or tertiary treatment stages. Similar to the wastewater treatment systems, such recycling may reduce the amount of added chemicals required in the tertiary treatment stage to reduce phosphorus or other pollutant concentrations to desired levels.

Figure 1:
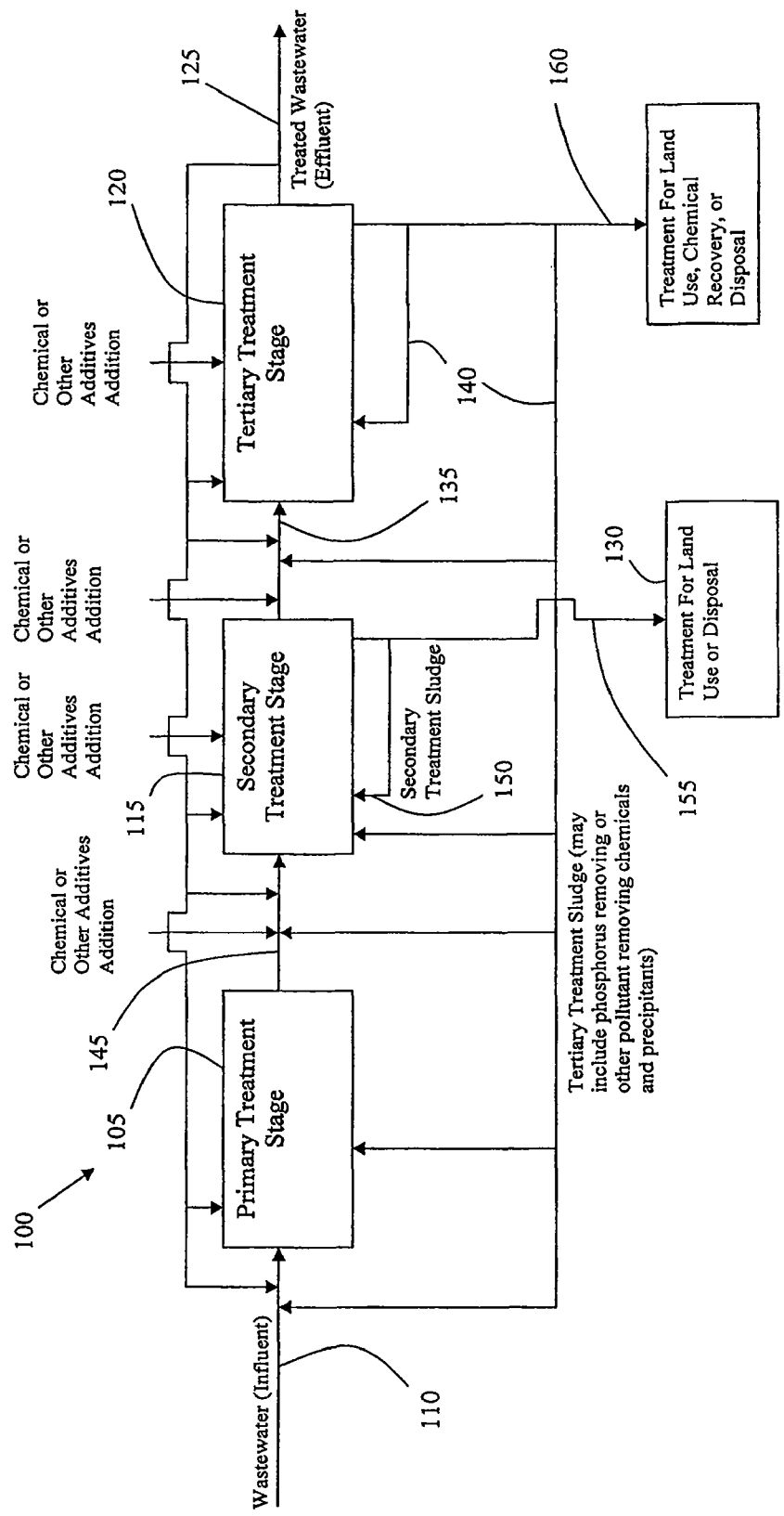
FIG. 1 is a schematic view of a first example of a wastewater treatment system for removing phosphorus or other pollutants from wastewater.

FIG. 1 depicts a schematic view of a first example of a wastewater treatment system 100 for removing phosphorus or other pollutants from wastewater. With reference to FIG. 1, the wastewater treatment system 100 may include a primary treatment stage 105 for receiving pre-treated or raw wastewater 110, which may also be referred to as influent, and a secondary treatment 115 stage fluidly connected to the first treatment stage 105. The first treatment stage 105 may be fluidly connected to the second treatment stage 115 by any known method or system to fluidly connect water or wastewater treatment stages or zones, including, but not limited to, pipes, channels, conduits, weirs and so on.

The secondary treatment stage 115 may, in turn, be fluidly connected to a tertiary treatment stage 120. Like the fluid connection between the first and secondary treatment stages 105, 115, the secondary treatment stage 115 may be fluidly connected to the tertiary treatment stage 120 by any known method or system to fluidly connect water or wastewater treatment stages or zones. The tertiary treatment stage 120 may discharge treated wastewater 125, which may also be called treated effluent, to the environment or to another water system. If desired, a portion of the treated wastewater 125 may be recycled upstream for further treatment or use in the system. Any treated wastewater 125 that is recycled may be returned to the system at any desired location, including, but not limited to, one or more locations that are upstream of the primary treatment stage 105, within the primary treatment stage 105, between the primary and secondary treatment stages 105, 115, within the secondary treatment stage 115, between the secondary and tertiary treatment stages 115, 120, or within the tertiary treatment stage 120.

The primary treatment stage 105 may involve separating solids from the wastewater influent 110. To separate solids from the wastewater influent 110, the primary treatment stage 105 may include one or more settling tanks, clarifiers or other conventional or known structures for separating suspended solids from a raw or pre-treated wastewater influent. However, in some systems the primary treatment stage 105 may be omitted or bypassed, and the wastewater 110 may be sent directly to the secondary treatment stage 115.

The secondary treatment stage 115 may include biological or other types of wastewater treatment systems to remove BOD (biochemical oxygen demand) and/or suspended solids to predetermined levels or percentages (e.g., to below 30 mg/L for BOD and/or to reduce BOD by at least 85%). Other pollutants, such as nitrogen, phosphorus, heavy metals and so on, may also be removed from the wastewater in the secondary treatment stage 115. The biological treatment systems may include trickling filters, activated sludge tanks or basins, oxidation or other treatment ponds, membrane bioreactors, or other systems for treating wastewater using aerobic and/or anaerobic microorganisms, or other biological approaches.

The biological treatment systems may further include settling tanks, clarifiers, membrane filters or other structures for separating sludge, suspended solids, chemical precipitates, and other solids from the biologically treated wastewater. Any portion of the separated secondary treatment sludge or other solids may be recycled upstream for reuse in the process. Pipes, channels, pumps and any other known solids, slurry or sludge conveyance devices, systems or methods may be used to transport the sludge upstream for reuse. Any such recycled sludge may be returned to the wastewater treatment system 100 at one or more locations upstream of, or within, the secondary treatment stage 115. Any non-recycled portions may be removed from the wastewater treatment system 100 for disposal, land use, or other purposes. Prior to disposing or using the non-recycled portions, the non-recycled portions may be treated using any known sludge or biosolids treatment system or method 130, including, but not limited to, thermal treatment, composting, and so on.

The effluent exiting the secondary treatment stage 115, separated from the solids using a solids-liquid separator, may be considered a biologically treated wastewater or effluent 135. The biologically treated wastewater or effluent 135 may have BOD or other pollutant amounts or concentrations that are at least less than a predetermined amount or concentration, respectively.

The biological treatment systems may be supplemented by adding chemicals or other additives to remove pollutants, such as nitrogen, phosphorus, and heavy metals, by precipitation, absorption, or other physical and/or chemical methods. The chemicals or other additives may include, but are not limited to, metal salts and ion exchange resins. The chemicals or other treatment additives may be added at any suitable point prior to or within the secondary treatment stage 115, including to the activated sludge tanks or basins, the settling tanks or clarifiers, and so on.

The tertiary treatment stage 120 may include treatment systems for removing residual suspended solids, nitrogen, phosphorus, and heavy metals contained in the biologically treated effluent. The tertiary treatment stage 120 may include reaction basins or zones for mixing chemicals to promote reactions to absorb and/or precipitate pollutants remaining in the wastewater after treatment in the primary and secondary treatment stages 105, 115. The tertiary treatment stage 120 may also include filters of a wide variety of configurations (such as granular and cloth media filters), settling tanks, clarifiers, membrane filters and other systems for separating solids from liquids.

During treatment of the wastewater in the primary and secondary treatment stages 105, 115 (or the secondary treatment stage 115 if the primary treatment stage 105 is omitted), a portion of the total phosphorus in the wastewater may be removed through various physical, chemical, and biological mechanisms, including sedimentation of particulate phosphorus, chemical precipitation and settling, uptake for cell synthesis by microorganisms, and enhanced biological phosphorus removal. Depending upon the configuration and treatment methods used in the primary and secondary treatment stages 105, 115, the total average phosphorus concentration in the biologically treated effluent 135 exiting the secondary treatment stage 115 may approach levels of 500 µg/L or less, with some systems at times reaching levels of 20 µg/L.

However, below approximately 100 µg/L or so, phosphorus concentrations may be too low to support the aerobic and anaerobic microorganisms, or other desired biological activity, in the secondary treatment system 115. Thus, a tertiary treatment stage 120 may often be necessary to reduce the average total phosphorus concentration to levels of approximately 100 to 500 µg/L, and may especially be necessary to reduce the average total phosphorus concentration to levels below 100 µg/L to avoid undesirably suppressing biological activity in the secondary treatment stage 115.

In the tertiary treatment stage 120, phosphorus removing chemicals, such as aluminum sulfate (alum), ferric and ferrous chloride, or ferric and ferrous sulfate, may be added to the biologically treated effluent 135 to further remove phosphorus. The phosphorus removing chemicals may remove phosphorus by direct precipitation and/or by formation of metal hydroxide floc with a capacity to absorb phosphate and other materials. The phosphorus removing chemicals may be rapidly mixed into the biologically treated effluent 135 to condition the phosphorus precipitate for solids-liquid separation. Approaches for separating the precipitated phosphorus and other solids may include gravity sedimentation (which may be assisted by the addition of ballasting material), granular media filtration, membrane filtration, and other solids-liquid separation methods.

At least a portion of the phosphorus removing chemicals, or the other solids or sludge (which may contain the phosphorus removing chemicals), separated from the chemically treated effluent in the tertiary treatment stage 120 may be recycled into the wastewater at one or more locations upstream of the primary treatment stage 105, in the primary treatment stage 105, between the primary and secondary treatment stages 105, 115, in the secondary treatment stage 115, between the secondary and tertiary treatment stages 115, 120, or within the tertiary treatment stage 120. Pipes, channels, pumps and any other known solids, slurry or sludge conveyance devices, systems or methods may be used to transport the phosphorus removing chemicals, solids and/or sludge 140 upstream for reuse. Such recycling forms a counter current flow of phosphorus removing chemicals (which may include phosphorus precipitated or absorbed to at least a portion of the phosphorus removing chemicals) to the wastewater flow in the water treatment system 100. This phosphorus removing chemicals counter current flow may reduce the amount of chemicals required to reduce phosphorus concentrations to a desired level compared to similar processes that do not recycle the separated solids. The reduction in chemicals may be up to approximately 33 percent or more.

The phosphorus removing chemicals used in the tertiary treatment stage 120 may be added in amounts up to or greater than the amounts required to reduce the average total phosphorus concentration in the effluent 125 discharged from the tertiary stage treatment 120 to a predetermined level. The predetermined level may range from 10 µg/L or less to 100 µg/L or less. In some systems, the average total phosphorus concentration in the wastewater may be approximately 100 µg/L or more after treatment in the secondary treatment stage 115 and may approach 10 µg/L or less after treatment in the tertiary treatment stage 120. In other systems, the average total phosphorus concentration in the wastewater may be approximately 20 µg/L or more after treatment in the secondary treatment stage 115 and may approach 10 µg/L or less after treatment in the tertiary treatment stage 120. However, for at least the reasons discussed above, it is less likely systems employing biological treatment in the secondary treatment stage 115 will produce wastewaters with phosphorus concentration approaching 20 µg/L after treatment of the wastewater in the secondary treatment stage 115.

In operation, wastewater 110 may flow to the primary treatment stage 105 for initial removal of suspended solids. From the primary treatment stage 105, pre-treated wastewater 145 may then flow to the secondary treatment stage 115 for biological treatment to reduce the amounts of at least one of BOD or suspended solids. Other pollutants, such as nitrogen, phosphorus, heavy metals and so on, may also be reduced in the wastewater. The primary treatment stage 105, however, may be omitted. When omitted, the wastewater 110 may be initially and biologically treated in the secondary treatment stage 115. After biological treatment in the secondary treatment stage 115, the biologically treated water may be separated from the solids to form a biologically treated effluent and a biological or secondary treatment stage sludge. A portion of the secondary treatment stage sludge 150 may be recycled upstream for reuse in the secondary treatment stage 115. Any secondary treatment sludge not recycled may be treated for disposal, or land or other use.

At least a portion of the biologically treated effluent 135 may then flow to the tertiary treatment stage 120 for advanced or polishing treatment to further reduce the amounts of suspended solids, nitrogen, phosphorus, heavy metals, or other pollutants contained in the biologically treated effluent 135. Portions of the biologically treated effluent not treated in the tertiary treatment stage 120 may be discharged to the environment, used in another water system, recycled back upstream for further treatment, or otherwise removed from or reused in the system. The biologically treated effluent 135 received by the tertiary treatment stage 120 may be subjected to one or more chemical treatments to reduce phosphorus or other pollutant concentrations in the biologically treated effluent 135. The chemicals may precipitate or otherwise insolubilize the phosphorus or other pollutants.

After chemical treatment in the tertiary treatment stage 120, the chemically treated biological effluent may be separated from the chemically formed solids or other sludge. The separated effluent may be further treated in the tertiary treatment stage 120 to reduce other pollutants not treated by the particular chemical treatment portion, or may be discharged to the environment, used in another water system, recycled back upstream for further treatment, or otherwise removed from or reused in the system. At least a portion of the chemically formed solids or other tertiary stage sludge 140 may be recycled upstream for reuse in the primary, secondary, and/or tertiary treatment stages 105, 115, 120. Any portions of the tertiary treatment solids or sludge 160 not recycled may be treated for disposal, recovery of the added chemicals, and so on. In some systems the tertiary treatment solids or sludge 160 may be combined with the secondary treatment sludge 155 for treatment. After completion of the tertiary treatment stage 120, the tertiary treated effluent 125 may be discharged to the environment, used in another water system, recycled back upstream for further treatment, or otherwise removed from or reused in the system.

Figure 2:
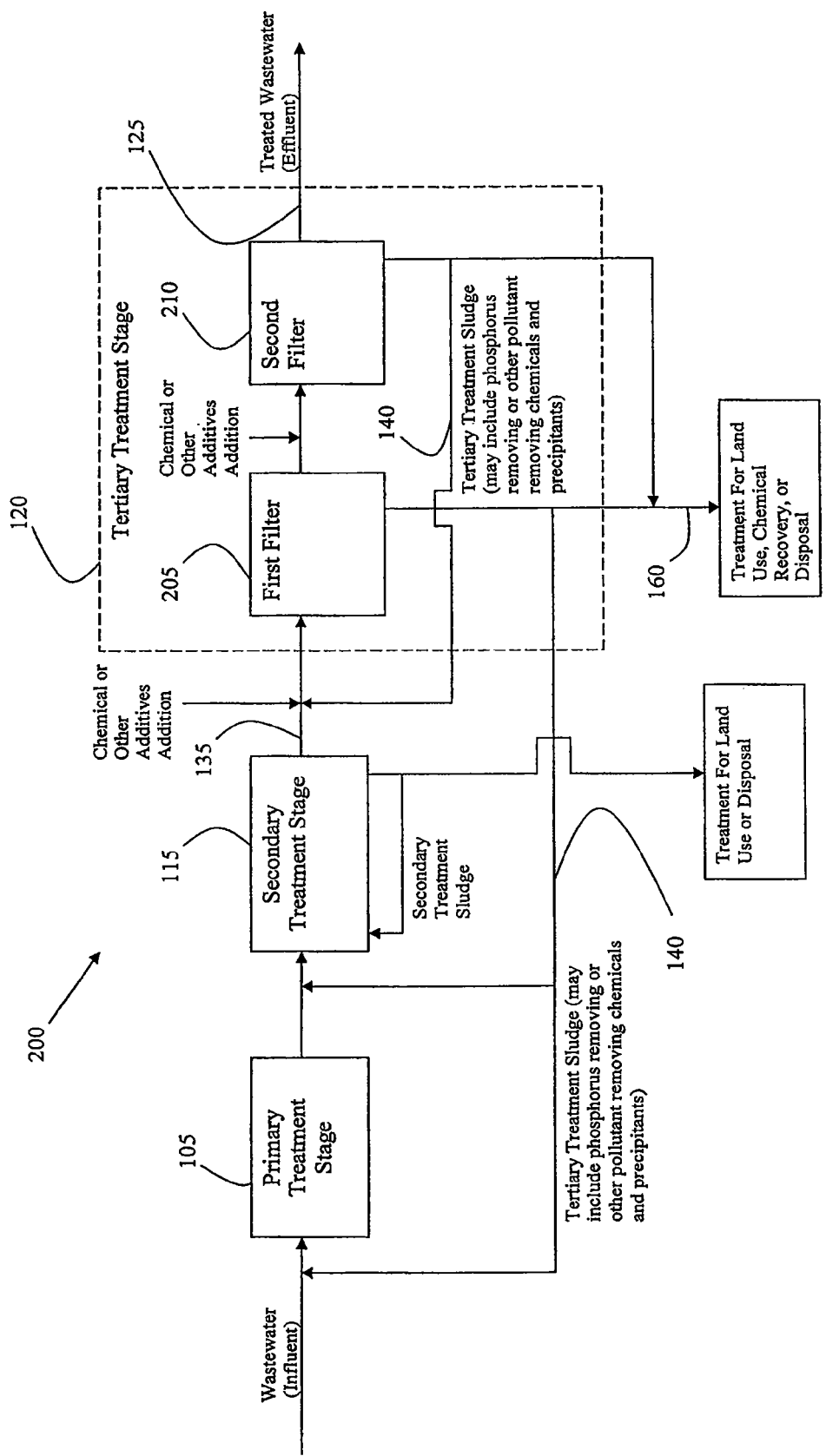
FIG. 2 is a schematic view of a second example of a wastewater treatment system for removing phosphorus or other pollutants from wastewater.

FIG. 2 depicts a schematic view of a second example of a wastewater treatment system 200 for removing phosphorus or other pollutants from wastewater where like reference numbers may be used for elements the same as or similar to elements of the first example of a wastewater treatment system 100. Like the first example of a wastewater treatment system 100, the second example of a wastewater treatment system 200 may include a primary treatment stage 105 fluidly connected to a secondary treatment stage 115, which may, in turn, be fluidly connected to a tertiary treatment stage 120. Like the first example of a wastewater treatment system 100, the primary, secondary and tertiary treatment stages 105, 115, 120 for the second example of a wastewater treatment system 200 may be fluidly joined by any known method or system to fluidly connect water or wastewater treatment stages or zones. The second example of a wastewater treatment system 200 operates in the same or a substantially similar manner as the first example of a wastewater treatment system 100.

The primary treatment stage 105 may include one or more tanks or other devices for separating suspended solids from raw or pretreated wastewater, and the secondary treatment stage 115 may be a conventional activated sludge system, or other biological water treatment system, for biologically treating the wastewater. In some systems, the primary treatment stage 105 may be omitted. The tertiary treatment stage 120 may include two granular media filters 205, 210 in series for separating precipitated phosphorus and other solids from the chemically treated effluent 125.

Although two filters 205, 210 are depicted, more or less than two filters may be used in the tertiary treatment stage 120. Further, the filters may be arranged in series, in parallel, or in any combination of series and parallel alignments. Yet further, the filters may employ cartridges or other filter materials in place of, or in combination with, the granular media. Still yet further, any other liquid-solid separation device, system or approach may be used in place of, or in combination with, any or all of the filters.

Phosphorus removing chemicals, such as metal salts, may be added to the biologically treated effluent 135 at one or more locations between the secondary treatment stage 115 and the first filter 205. Phosphorus removing chemicals may also be added to the wastewater at one or more locations between the first and second filters 205, 210. At least a portion of the phosphorus removing chemicals or tertiary treatment sludge 140 separated by the second filter 210 may be recycled to one or more locations between the secondary treatment stage 115 and the first filter 205. Similarly, at least a portion of the phosphorus removing chemicals or tertiary treatment sludge 140 separated by the first filter 205 may be recycled to one or more locations upstream of the primary treatment stage 105 and/or between the primary and secondary treatment stages 105, 115.

Although not shown, at least a portion of the phosphorus removing chemicals or tertiary treatment sludge 140 from the second filter 210 may be recycled to one or more locations upstream of the primary treatment stage 105, between the primary and secondary treatment stages 105, 115, between the first and second filters 205, 210, or within the primary or secondary treatment systems 105, 115. Also, at least a portion of the phosphorus removing chemicals or tertiary treatment sludge 140 from the first filter 205 may be recycled to one or more locations between the secondary treatment stage 115 and the first filter 205 or within the primary or secondary treatment systems 105, 115. Like the first example of a wastewater system 100, any portions of the tertiary treatment solids or sludge 160 not recycled for the second example of a wastewater treatment system 200 may be treated for disposal, recovery of the added chemicals, and so on.

Figure 3:
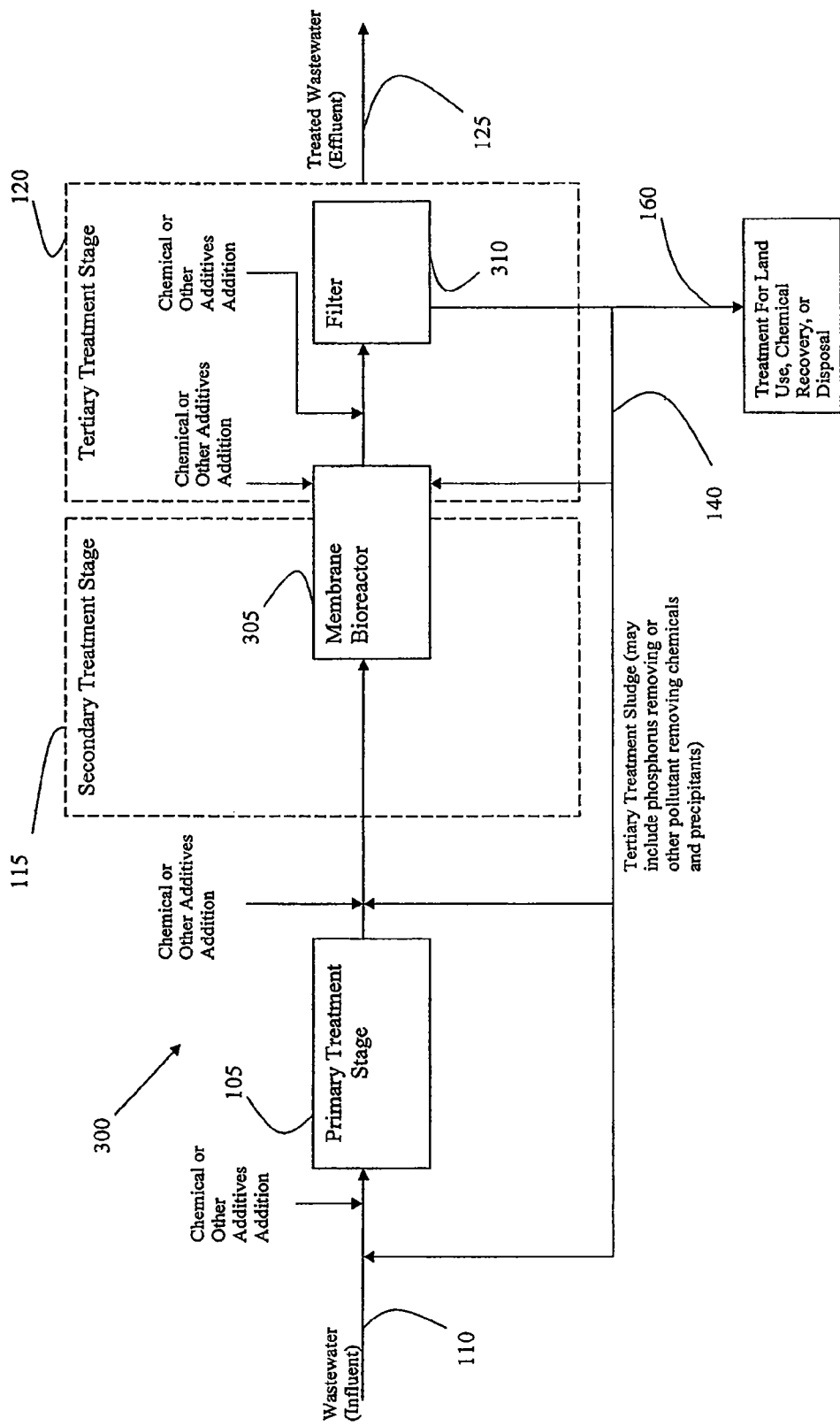
FIG. 3 is a schematic view of a third example of a wastewater treatment system for removing phosphorus or other pollutants from wastewater.

FIG. 3 depicts a schematic view of a third example of a wastewater treatment system 300 for removing phosphorus or other pollutants from wastewater where like reference numbers may be used for elements the same as, or similar to elements, of the first and second examples of wastewater treatment systems 100, 200. Like the first and second examples of wastewater treatments systems 100, 200, the third example of a wastewater treatment system 300 may include a primary treatment 105 stage fluidly connected to secondary treatment stage 115, which may, in turn, be fluidly connected to a tertiary treatment stage 120. The primary treatment stage 105 may include a tank or other structure for separating suspended solids from raw or pretreated wastewater 110, and the secondary treatment stage 115 may include a membrane bioreactor 305. The tertiary treatment stage 120 may also include at least a portion of the membrane bioreactor 305. In some systems, the primary treatment stage 105 may be omitted.

The membrane bioreactor 305 may be any membrane bioreactor described in U.S. Pat. No. 6,946,073 (the '073 patent), or any known or commercially available membrane bioreactor system. The membrane bioreactors described in the '073 patent use a combination of biological and chemical phosphorus removal mechanisms to reduce phosphorus levels in wastewater. Pilot testing of these systems demonstrate that they can reliably reduce total phosphorus concentrations below 100 µg/L and can approach levels of approximately 20 µg/L. To reach average phosphorus concentration levels of 10 µg/L or less, however, an additional chemical addition and filtering step in the tertiary treatment stage 120 may be necessary.

Like the first and second examples of wastewater treatment systems 100, 200, the tertiary treatment stage 120 of the third example of a wastewater treatment system 300 may include addition of phosphorus removing chemicals at any location within the tertiary treatment stage 120 to reduce phosphorus concentrations to a desired level. The added chemicals may be any suitable chemical for reducing or removing phosphorus, including any chemicals described in the previous examples of wastewater treatment systems 100, 200. A filter 310 may be used to separate the precipitated phosphorus and other solids from the chemically treated effluent. The filter 310 may be any suitable solids-liquid separator, including any described for the previous examples of wastewater treatment systems 100, 200.

At least a portion of the separated phosphorus removing chemicals or tertiary treatment sludge 140 may be recycled to one or more locations upstream of the primary treatment stage 105, between the primary and second treatment stages 105, 115, or directly to the membrane bioreactor 305. Although not shown, at least a portion of the phosphorus removing chemicals or tertiary treatment sludge 140 may also be recycled to one or more locations upstream within the primary or secondary treatment systems 105, 115, between the secondary and tertiary treatment systems 115, 120, or within the tertiary treatment system 120. Like the first two examples of wastewater systems 100, 200, any portions of the tertiary treatment solids or sludge 160 not recycled may be treated for disposal, recovery of the added chemicals, and so on.

Chemicals may optionally be added to the system 300 at one or more locations upstream of the primary treatment stage 105, between the primary and second treatment stages 105, 115, and/or within the secondary treatment stage 115 (including within the membrane bioreactor 305). The chemicals may include phosphorus removing chemicals, such as any of the metal salts described above.

Figure 4:
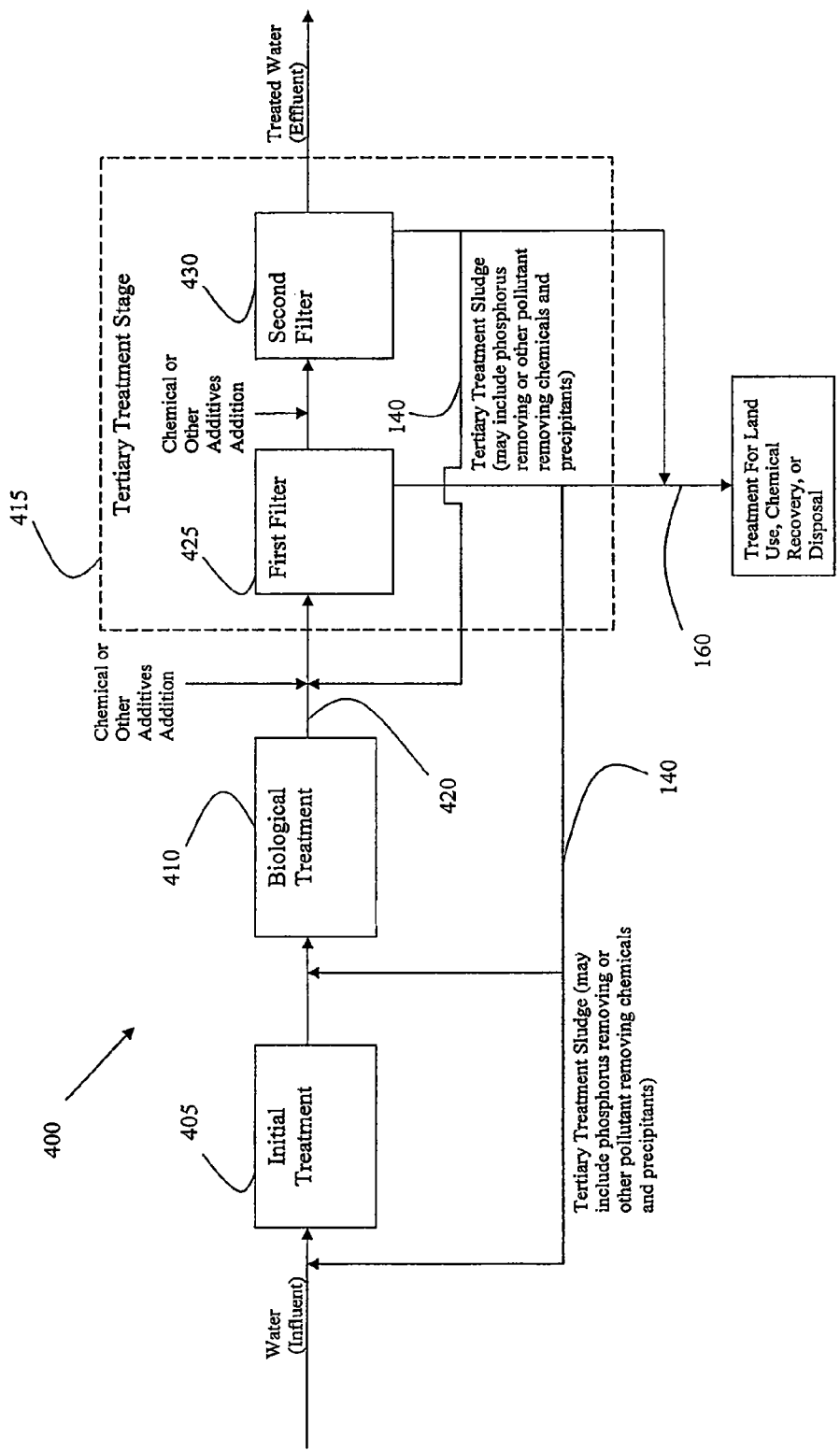
FIG. 4 is a schematic view of an example of a water treatment system for removing phosphorus or other pollutants from water.

FIG. 4 depicts a schematic view of an example of a water treatment system 400 for removing phosphorus or other pollutants from water, such as arsenic or heavy metals. The water treatment system 400 may include an initial treatment stage 405 in fluid communication with a biological treatment stage 410, and a polishing or tertiary treatment stage 415 in fluid communication with the biological treatment stage 410. The initial treatment stage 405 may include water treatment devices and approaches similar to the primary treatment stages 105 for the examples of wastewater systems 100, 200, 300, described above and also a wide variety of devices and processes typically included in water treatment applications. The biological treatment stage 410 may include biological activated carbon filtration or any other biological treatment approach.

Like the wastewater treatment systems 100, 200, 300, previously described, the tertiary treatment stage 415 for the water treatment system 400 may include systems for removing residual suspended solids, nitrogen, phosphorus, and heavy metals contained in the biologically treated effluent 420. For example, the tertiary treatment stage 415, like the tertiary treatment stages 120 in the wastewater treatments systems 100, 200, 300, may include reaction basins or zones for mixing chemicals to promote reactions to absorb and/or precipitate pollutants remaining in the water after initial and biological treatment. The tertiary treatment stage 415 may also include filters of a wide variety of configurations (such as granular and cloth media filters), settling tanks, clarifiers, membrane filters and other systems for separating solids from liquids.

The tertiary treatment stage 415 depicted in FIG. 4 shows two filters 425, 430 in series with chemical addition prior to each filter like the second example of a wastewater treatment system 200. Like the previous examples of wastewater treatment systems 100, 200, 300, however, the tertiary treatment stage 415 of the water treatment system 400 may utilize any tertiary treatment systems or approaches, or combination of systems and approaches. Thus, the tertiary treatment stage 415 illustrated in the FIG. 4 is merely illustrative of one possible tertiary treatment system and is not intended to imply a particular system or to otherwise be limiting.

Like the second wastewater treatment system 200, treatment chemicals, such as metal salts, may be added to the biologically treated effluent 420 at one or more locations between the biological treatment stage 410 and the first filter 425. Treatment chemicals may also be added to the wastewater at one or more locations between the first and second filters 425, 430. At least a portion of the treatment chemicals or tertiary treatment sludge 140 separated by the second filter 430 may be recycled to one or more or locations between the biological treatment stage 410 and the first filter 425. Similarly, at least a portion of the treatment chemicals or tertiary treatment sludge 140 separated by the first filter 425 may be recycled to one or more locations upstream of the initial treatment stage 405 and/or between the initial and the biological treatment stages 405, 410.

Also like the second wastewater treatment system 200, at least a portion of the treatment chemicals or tertiary treatment sludge 140 from the second filter 430 may be recycled to one or more locations upstream of the initial treatment stage 405, between the initial and biological treatment stages 405, 410, between the first and second filters 425, 430, or within the initial or biological treatment systems 425, 430. Also, at least a portion of the treatment chemicals or tertiary treatment sludge 140 from the first filter 425 may be recycled to one or more locations between the biological treatment stage 410 and the first filter 425 or within the initial or biological treatment systems 405, 410. Like the examples of wastewater treatment systems described above, any portions of the tertiary treatment solids or sludge 160 not recycled may be treated for disposal, recovery of the added chemicals, and so on.

Although the systems above are described with respect to using chemicals to reduce phosphorus concentrations, any water or wastewater treatment system which follows a biological treatment with a tertiary or polishing treatment that utilizes metal salts or other similar chemicals to reduce other pollutants may include recycling of the separated chemicals upstream in a manner similar to those described for the phosphorus reducing chemicals. Such pollutants may include, but are not limited to, heavy metals, such as arsenic and the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for treating wastewater comprising:
biologically treating a wastewater including a pollutant with a pollutant concentration to produce a biologically treated wastewater and a first sludge;
separating at least a portion of the biologically treated wastewater from the first sludge;
chemically treating the at least a portion of the separated biologically treated wastewater using at least a metal salt to reduce the pollutant concentration and to produce a second sludge comprising at least a portion of the metal salt; and
contacting the at least a portion of the separated biologically treated wastewater with at least a portion of the second sludge at least prior to or during the chemical treatment.

2. The method of claim 1, wherein the pollutant includes phosphorus.

3. The method of claim 2, wherein the pollutant concentration is greater than approximately 20 µg/L prior to chemically treating the at least a portion of the separated biologically treated wastewater and is less than approximately 10 µg/L after chemically treating the at least a portion of the separated biologically treated wastewater.

4. The method of claim 1, further comprising separating the chemically treated wastewater from the second sludge prior to contacting the at least a portion of the separated biologically treated wastewater with the second sludge.

5. The method of claim 1, further comprising:
subjecting at least a portion of the chemically treated wastewater to a second chemical treatment using a second metal salt to further reduce the pollutant concentration and to produce a third sludge comprising at least a portion of the second metal salt; and contacting the at least a portion of the separated biologically treated wastewater with at least a portion of the third sludge prior to the first chemical treatment.

6. The method of claim 5, further comprising separating the second chemically treated wastewater from the third sludge prior to contacting the at least a portion of the third sludge with the at least a portion of the separated biologically treated wastewater.

7. The method of claim 1, wherein biologically treating the wastewater includes treating the wastewater using a membrane bioreactor.

8. The method of claim 1, further comprising contacting the wastewater with at least a portion of the second sludge prior to the biological treatment.

9. A method for treating wastewater comprising:
biologically treating a wastewater including a pollutant with a pollutant concentration to produce a biologically treated wastewater and a first sludge;
separating at least a portion of the biologically treated wastewater from the first sludge;
chemically treating at least a portion of the separated biologically treated wastewater using at least a metal salt to reduce the pollutant concentration and to produce a second sludge comprising at least a portion of the metal salt; and
contacting the wastewater with at least a portion of the second sludge at least prior to or during the biological treatment.

10. A method for treating water comprising:
biologically treating a water including a pollutant with a pollutant concentration to produce a biologically treated water;
chemically treating at least a portion of the biologically treated water using a treatment chemical to reduce the pollutant concentration and to produce a sludge comprising at least a portion of the treatment chemical; and
contacting the at least a portion of the biologically treated water with at least a portion of the sludge at least prior to or during the chemical treatment.

11. The method of claim 10, wherein the water comprises wastewater.

12. The method of claim 11, wherein the treatment chemical comprises a metal salt.

13. The method of claim 12, wherein the pollutant includes phosphorus.

14. The method of claim 13, wherein the pollutant concentration is greater than approximately 20 µg/L prior to chemically treating the at least a portion of the separated biologically treated water and is less than approximately 10 µg/L after chemically treating the at least a portion of the separated biologically treated water.

15. A method for treating water comprising:
biologically treating a water including a pollutant with a pollutant concentration to produce a biologically treated water;
chemically treating at least a portion of the biologically treated water using at least a treatment chemical to reduce the pollutant concentration and to produce a sludge comprising at least a portion of the treatment chemical; and
contacting the water with at least a portion of the sludge at least prior to or during the biological treatment.

16. The method of claim 15, wherein the treatment chemical comprises a metal salt.

17. The method of claim 15, wherein the pollutant includes phosphorus.

18. The method of claim 15, wherein the water comprises wastewater.

* * * * *